April 7, 1959  H. C. KARCHER  2,880,573
AFTERBURNER FUEL INJECTION SYSTEM
Filed Aug. 27, 1952  2 Sheets-Sheet 1
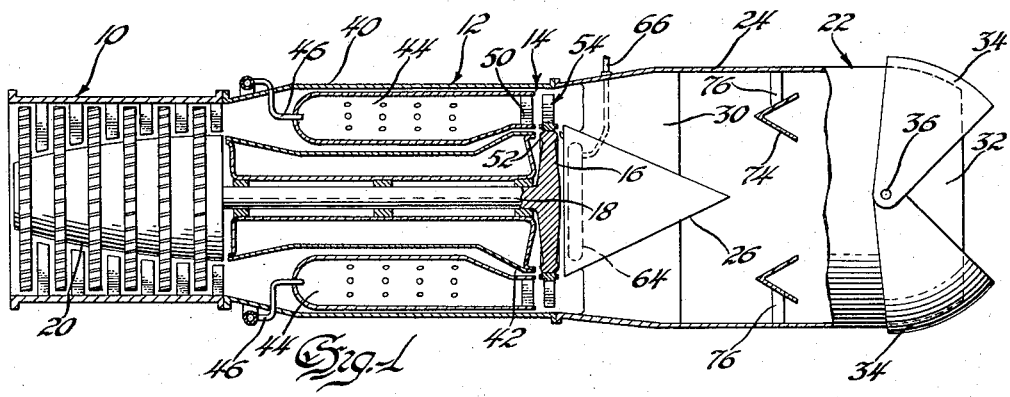
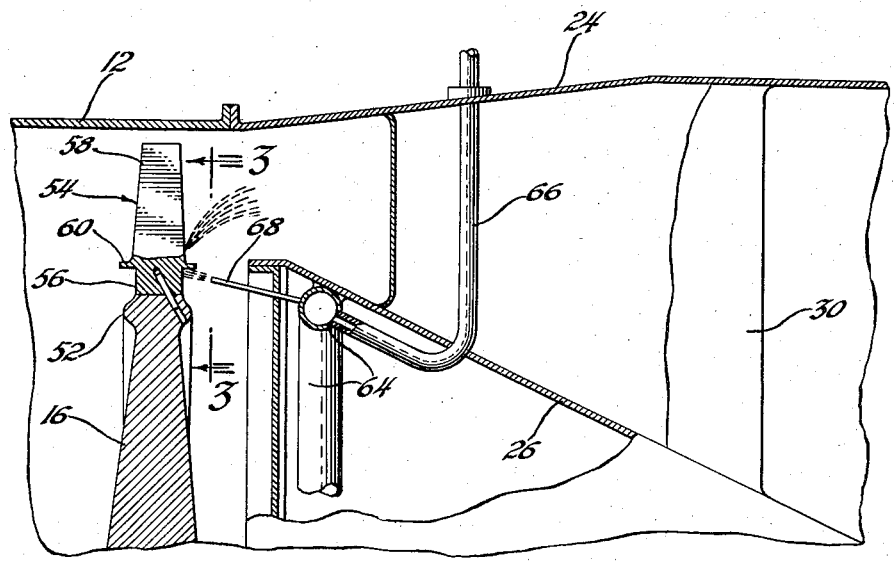
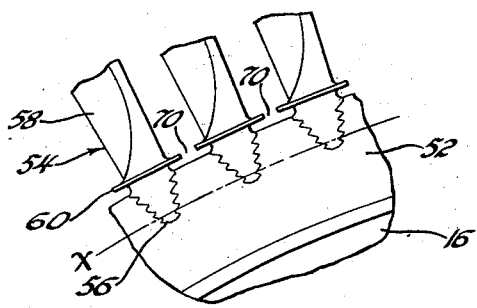
Inventor
Harry C. Karcher
By Willits, Helmig & Baillio
Attorneys April 7, 1959   H. C. KARCHER   2,880,573
AFTERBURNER FUEL INJECTION SYSTEM
Filed Aug. 27, 1952   2 Sheets-Sheet 2

Inventor
Harry C. Karcher
By Willits, Helwig & Baillio
Attorneys

United States Patent Office 2,880,573
Patented Apr. 7, 1959

2,880,573

AFTERBURNER FUEL INJECTION SYSTEM

Harry C. Karcher, Indianapolis, Ind., assignor to General Motors Corporation, Detroit, Mich., a corporation of Delaware Application August 27, 1952, Serial No. 306,697

3 Claims. (Cl. 60—35.6)

This invention relates to afterburners for gas turbine jet engines, and, more particularly, to an improved afterburner fuel injection system for jet propelled aircraft engines.

In order to increase the thrust of turbojet aircraft engines for take-off and other conditions, such engines have been fitted with afterburners which burn supplementary fuel in the exhaust gases discharging from the turbine before the gases leave the propulsive jet nozzle of the engine. The supplementary fuel is introduced into the exhaust duct through a burner grid or fuel manifold usually located some distance behind the turbine and in the path of the gas stream.

Among the disadvantages presented by such an arrangement is that the manifold is unprotected and is directly subjected to the intense heat and the buffeting action of the high velocity exhaust gases flowing through the turbine, as a result of which special consideration need be given to the design thereof. Also, the engine efficiency may be impaired slightly by reason of the obstruction to the flow of exhaust gases presented by the fuel manifold. Another disadvantage with such arrangements has been the difficulty of assuring proper atomization and prompt and reliable ignition of the supplementary fuel, and to this end various fuel injection systems for atomization and auxiliary electric ignition systems for ignition have been employed to ignite the fuel supplied to the afterburner. Such systems, however, are necessarily complex and become progressively less reliable and satisfactory at higher altitude operation of the engine.

Accordingly, the present invention has for its general objects to effect improvements in afterburners for jet propelled aircraft engines, and, more specifically, to provide a fuel injection system therefor which assures satisfactory ignition of the supplementary fuel supplied to the afterburner, which is not subjected to the buffeting action of the exhaust gases and which does not obstruct the flow of the gases through the engine exhaust duct.

In accordance with the invention, there is provided an afterburner fuel injection system wherein fuel is introduced from a fuel manifold or distributor contained within the inner tail cone of the turbine exhaust duct and is spouted onto the turbine wheel so as to be centrifugally slung into the turbine exhaust duct by the force of rotation of the turbine wheel. The fuel manifold is thus protected from the buffeting action of the exhaust gases and may be of considerably simplified design and construction. By spouting the fuel onto the rapidly revolving turbine wheel, some cooling of the latter is accomplished, and the fuel is properly atomized by being broken into finely divided droplets so as to dispense with the need for a high presure fuel supply system as employed in some fuel injection systems proposed heretofore. The atomized fuel is centrifugally slung into the turbine exhaust duct in the form of a fine spray and is readily vaporized and ignited, conditions of combustion, temperature and gas velocity being such as to provide satisfactory ignition at this point in the engine.

The above and other objects, features and advantages attending the invention will appear more fully from the following detailed description and drawings; wherein:

Fig. 1 is a schematic illustration of a gas turbine jet engine in which the present invention may be embodied;

Fig. 2 is a longitudinal sectional view of an enlarged portion of Fig. 1 illustrating one form of afterburner fuel injection system in accordance with the present invention that may be embodied in the engine of Fig. 1;

Fig. 3 is a broken transverse view of a portion of Fig. 2 taken in the plane 3—3 thereof;

Figure 4:
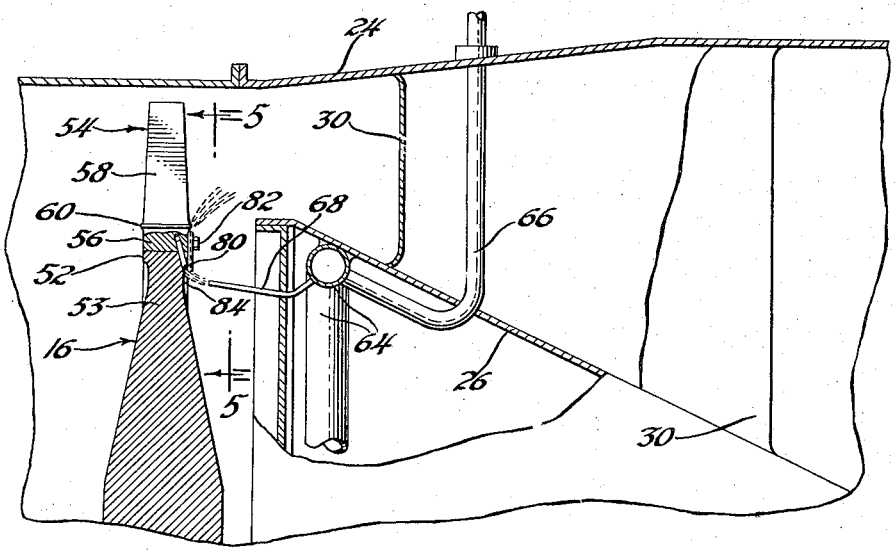
Fig. 4 is a longitudinal sectional view of an afterburner fuel injection system in accordance with another form of the invention that may be employed in the engine of Fig. 1.

Referring to the drawings, Fig. 1 illustrates in a diagrammatic manner a known type of gas turbine jet propulsion engine in which the present invention may be embodied. The construction of the engine will not be described in detail as the specific features thereof are not material to the invention which may be incorporated in jet engines of various configurations. The illustrative engine comprises in general a compressor 10 of the axial-flow type discharging into a combustion apparatus 12, the combustion products from which drive a turbine 14. The wheel 16 of the turbine 14 is coupled by a shaft 18 to the rotor 20 of the compressor. The turbine discharges into an extended exhaust duct 22 in which afterburning is effected. The exhaust duct 22 is defined by an extended outer duct wall 24 and by an inner wall or tail cone 26 which is located in the forward portion of the duct 22 and is supported from the outer duct wall 24 by a number of faired hollow struts 30. The exhaust duct 22 terminates in a jet propulsion nozzle 32, the area of which may be varied by flaps or eyelid members 34 movable about a pivot 36 by a suitable actuating mechanism.

The combustion apparatus 12 may comprise an outer shroud or casing 40, an inner shroud or casing 42, and combustion chambers or flame tubes 44 mounted between the outer and inner casings 40 and 42. The flame tubes 44 are perforated for the admission of air and each is fitted at its forward end with a fuel spray nozzle 46. In the operation of the engine, air drawn into and compressed by the compressor 10 flows between the outer and inner casing 40 and 42 of the combustion apparatus 12 into the flame tubes 44 to be heated by the combustion of the primary fuel injection into the latter by the nozzle 46. The combustion products flow from the flame tubes through a turbine nozzle diaphragm 50 (Fig. 1) to drive the turbine wheel 16, the slotted rim 52 of which circumferentially mounts a number of turbine buckets 54 each having a root portion 56, a bladed portion 58 and a platform portion 60 overhanging the ends and sides of the root portion. The gases exhausted from the turbine are diffused and retarded in axial velocity in the diverging exhaust duct 22 and are discharged through the nozzle 32.

In distinction to afterburner fuel injection systems heretofore proposed wherein fuel is introduced directly into the exhaust gas stream through a fuel distributor or manifold located intermediate the ends of the exhaust duct 22, the present invention provides a centrifugal sling fuel injection system that utilizes the centrifugal force of the turbine wheel to sling the fuel into the duct and comprises, in the main, a ring fuel manifold 64 located adjacent the turbine and contained within the tail cone 26 of the exhaust duct. The fuel manifold is suitably secured to the interior of the tail cone and has connected thereto a number of fuel inlet lines 66 that extend radially through the struts 30 between the tail cone and outer duct wall 24 and emerge from the latter to be connected through suitable check valves to a fuel supply system. Extending forwardly from and connected to the manifold 64 are a number of tubes of small inner diameter that serve as nozzles 68, the ends of which terminate a short distance behind the back face of the rim 52 of the turbine wheel 16, substantially as shown.

Supplementary fuel is supplied to the manifold 64 through the inlet lines 66 and spouted or dumped from the nozzles 68 onto the back face of the turbine wheel near the periphery thereof and inwardly of the bucket platforms 60 where the turbine bucket roots 56 engage the wheel rim 52 as indicated generally at X on Fig. 3. By reason of the high rotational velocity of the turbine, the fuel is dispersed into finely divided particles so as to be atomized and is centrifugally slung radially outwardly in the form of a fine spray through the slots or spaces 70 formed between the sides of the platforms 60 of adjacent turbine buckets. Preferably, a low pressure fuel supply system is employed in order to assure proper atomization of the fuel. The fuel spray is readily vaporized and easily ignited as conditions of combustion, temperature and gas velocity in a region a few inches behind the turbine have been found to produce a tongue of flame or hot streak that will provide satisfactory ignition of supplementary fuel introduced at this point. Suitable baffles or flame holders 74 (Fig. 1) supported from the outer duct wall 24 by appropriate struts 76 are provided to create controlled turbulence in the gas stream in order to prevent flame blowout at higher altitudes of operation.

In normal operation, the afterburner is out of action and the eyelid members 34 of Fig. 1 are moved to reduce the area of the jet nozzle. When increased thrust is required, fuel is supplied to the afterburner and is ignited and burned in the rear portion of the exhaust duct in order to increase the energy of the jet. When the afterburner is in operation, the eyelids 34 are opened to provide the maximum area of the jet nozzle.

Figures 5, 6:
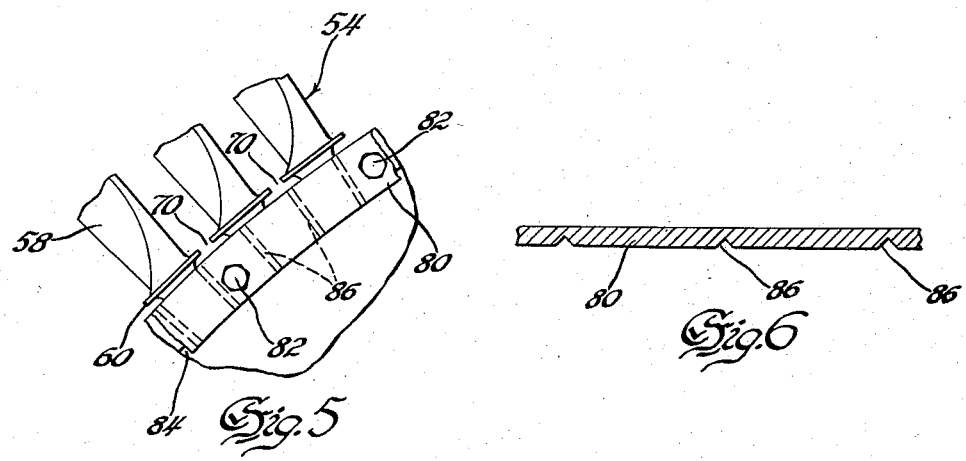
Fig. 5 is a broken transverse view taken in the plane 5—5 of Fig. 4.
Fig. 6 is a broken detail view of a part of the invention shown in Figs. 4 and 5.

In the embodiment of the invention illustrated in Figs. 4, 5 and 6, the back face of the turbine wheel has a flat annular plate 80 that is coaxial with the turbine wheel 16 and secured to the rim 52 thereof as by stud bolts 82. The inner portion of the annular plate overhangs the rim of the turbine wheel so as to form an annular lip or gutter 84 (Fig. 4) between the back face of the wheel neck 53 and the adjacent surface of the plate 80, substantially as shown. The plate 80 contains a number of spaced troughs 86 (Fig. 6) in the form of V-shaped grooves, for example, which extend radially between the outer edge and inner edge of the plate and serve as injection grooves to direct the fuel, which is spouted into the lip 84, radially outwardly into the turbine exhaust duct by the centrifugal force of the wheel, as explained above. The fuel is supplied from a low pressure supply system through one or more fuel inlet lines 66 extending through the struts 30 to the ring fuel manifold 64 within the inner tail cone 26 of the exhaust duct 22. The fuel is spouted into the lip 84 from a fuel distributor comprising one or more nozzles or tubes 68 connected to the manifold 64. The fuel distributor system may be simplified further by eliminating the manifold entirely and extending the fuel inlet line 66 to spout fuel directly into the lip 84, if desired.

The above described arrangements thus present an afterburner fuel injection system that is of extremely simple design and yet is highly effective in operation. The system eliminates some of the principal disadvantages of prior systems in that the burner or fuel manifold is not subjected to the high temperature and buffeting action of the exhaust gases, whereby the system is adapted to longer service life. The burner is removed from the path of the gas stream so as not to affect the efficiency of the engine and assures proper atomization and ignition of the supplementary fuel without the use of a high pressure fuel injection system and an electrical ignition system.

It will be understood that the above described arrangements are but illustrative of the application of the principles of the invention and that numerous other arrangements may be devised by those skilled in the art without departing from the spirit and scope of the invention.

I claim:

1. In combination, a compressor, a combustion apparatus supplied thereby, means for supplying fuel to said combustion apparatus, a turbine powered by said combustion apparatus, a reactive propulsion exhaust gas duct extending from said turbine, said turbine comprising a nozzle and a rotor wheel having a plurality of turbine buckets mounted about the periphery thereof, each of said turbine buckets having a bladed body portion, a root portion engaging said turbine wheel and an overhanging platform portion joining the said body and root portions, adjacent ones of said buckets having a mechanical clearance space provided laterally between the said platform portions thereof and an afterburner in said exhaust duct immediately behind said turbine and including fuel distributing means therein removed from the path of the gases exhausted through said duct, for spouting supplementary fuel on the back face of said turbine wheel where the said bucket root portions engage the said turbine wheel, whereby the supplementary fuel will be centrifugally slung from the spaces formed between the sides of adjacent bucket platforms into said exhaust duct by the force of rotation of said turbine wheel.

2. In combination, a compressor, a combustion apparatus supplied thereby, means for supplying fuel to said combustion apparatus, a turbine powered by said combustion apparatus, said turbine comprising a nozzle and a rotor wheel having a plurality of turbine buckets mounted about the periphery thereof, each of said turbine buckets having a bladed body portion, a root portion engaging said turbine wheel and an overhanging platform portion joining said body and root portions, adjacent ones of said buckets having a mechanical clearance space provided laterally between the said platform portions thereof a reactive propulsion exhaust gas duct extending from said turbine and comprising an extended outer duct wall and an inner tail cone supported from said outer duct wall, and an afterburner within said exhaust duct immediately behind said turbine and including fuel distributing means disposed within said inner tail cone so as to be removed from the path of the gases exhausted through said exhaust duct for spouting supplementary fuel on the back face of said turbine wheel where the said bucket root portions engage said turbine wheel, whereby said supplementary fuel will be centrifugally slung from the spaces formed between the sides of adjacent ones of said bucket platforms into said exhaust duct by the force of rotation of said turbine wheel.

3. In combination, a compressor, a combustion apparatus supplied thereby, means for supplying fuel to said combustion apparatus, a turbine powered by said combustion apparatus, said turbine comprising a nozzle and a rotor wheel having a plurality of turbine buckets mounted about the periphery thereof, each of said turbine buckets having a bladed body portion, a root portion engaging said turbine wheel and an overhanging platform portion joining the said body and root portions, adjacent ones of said buckets having a mechanical clearance space provided laterally between the said platform portions thereof a reactive propulsion exhaust gas duct extending from said turbine and comprising an extended outer duct wall, an inner tail cone within said outer duct wall and a number of hollow struts extending therebetween, and an afterburner in said exhaust duct immediately behind said turbine, said afterburner including a fuel manifold within said inner tail cone so as to be removed from the path of the gases exhausted through said exhaust duct, and having connected thereto a number of fuel inlet lines extending through said hollow struts and a number of tubes terminating behind the back face of said turbine wheel for spouting supplementary fuel on the back face of said turbine wheel where the said bucket root portions engage said turbine wheel, whereby said supplementary fuel will be centrifugally slung from the spaces formed between the sides of adjacent ones of said bucket platforms into said exhaust duct by the force of rotation of said turbine wheel.

References Cited in the file of this patent

UNITED STATES PATENTS

| | | |
|---|---|---|
| 1,824,893 | Holzwarth | Sept. 29, 1931 |
| 2,438,998 | Halford | Apr. 6, 1948 |
| 2,479,776 | Price | Aug. 23, 1949 |
| 2,479,777 | Price | Aug. 23, 1949 |
| 2,520,967 | Schmitt | Sept. 5, 1950 |
| 2,575,682 | Price | Nov. 20, 1951 |
| 2,636,344 | Heath | Apr. 28, 1953 |
| 2,659,196 | Brown | Nov. 17, 1953 |